United States Patent
Ottow et al.

(10) Patent No.: US 9,689,502 B2
(45) Date of Patent: Jun. 27, 2017

(54) ROTARY EXHAUST VALVE SYSTEM

(71) Applicant: ROLLS-ROYCE CORPORATION, Indianapolis, IN (US)

(72) Inventors: Nathan W. Ottow, Indianapolis, IN (US); Nathan J. Cooper, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 25 days.

(21) Appl. No.: 14/922,709

(22) Filed: Oct. 26, 2015

(65) Prior Publication Data

US 2017/0114910 A1    Apr. 27, 2017

(51) Int. Cl.
| | |
|---|---|
| *F16K 3/26* | (2006.01) |
| *F16K 11/076* | (2006.01) |
| *F04D 27/00* | (2006.01) |
| *F16K 31/52* | (2006.01) |
| *F16K 3/24* | (2006.01) |

(52) U.S. Cl.
CPC .......... *F16K 11/076* (2013.01); *F04D 27/001* (2013.01); *F16K 3/24* (2013.01); *F16K 3/26* (2013.01); *F16K 31/52* (2013.01); *F16K 31/523* (2013.01); *F05D 2260/83* (2013.01); *Y10T 137/87491* (2015.04); *Y10T 137/87523* (2015.04)

(58) Field of Classification Search
CPC ..... Y10T 137/87523; Y10T 137/87491; F16K 3/24; F16K 3/26; F16K 31/52; F16K 31/523

USPC ....... 137/601.12, 601.16; 251/127, 279, 280, 251/284–286, 288, 344, 345
See application file for complete search history.

(56) References Cited

U.S. PATENT DOCUMENTS

| | | | | | |
|---|---|---|---|---|---|
| 2,410,960 | A | * | 11/1946 | Bunn | F16K 1/36 137/338 |
| 3,685,536 | A | * | 8/1972 | Bake | F16K 1/12 137/338 |
| 4,205,820 | A | * | 6/1980 | Bray | F16K 1/221 251/243 |
| RE32,197 | E | * | 7/1986 | Self | F15D 1/14 137/549 |
| 5,518,366 | A | | 5/1996 | Gray | |
| 5,592,821 | A | | 1/1997 | Alary et al. | |
| 5,845,482 | A | | 12/1998 | Carscallen | |
| 8,133,017 | B2 | | 3/2012 | Schott et al. | |
| 8,286,416 | B2 | | 10/2012 | Schirtzinger et al. | |
| 8,438,855 | B2 | | 5/2013 | Schott | |
| 2013/0064659 | A1 | | 3/2013 | Geisner | |

* cited by examiner

*Primary Examiner* — Matthew W Jellett
(74) *Attorney, Agent, or Firm* — McCracken & Gillen LLC

(57) ABSTRACT

According to one aspect, a rotary exhaust valve system includes an arcuate ring having a first plurality of apertures and a rotary valve ring disposed in an overlapping relation with the arcuate ring. The rotary valve ring has a second plurality of apertures forming therein corresponding to at least some of the first plurality of apertures. A first crank is disposed in a first side of the rotary exhaust valve system, and a second crank is disposed in a second side of the rotary exhaust valve system. The second crank is connected to the first crank and the rotary valve ring, and the first crank actuates the second crank and moves the rotary valve ring such that openings of the first plurality of apertures are closed and opened.

18 Claims, 7 Drawing Sheets

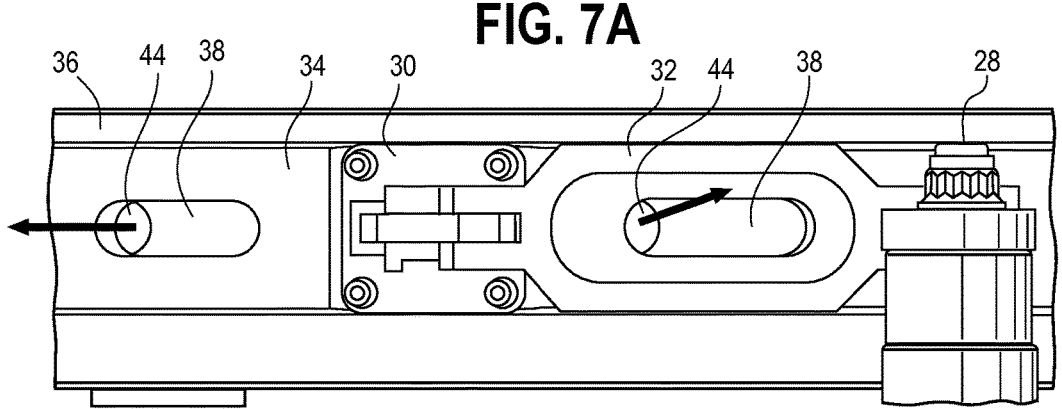
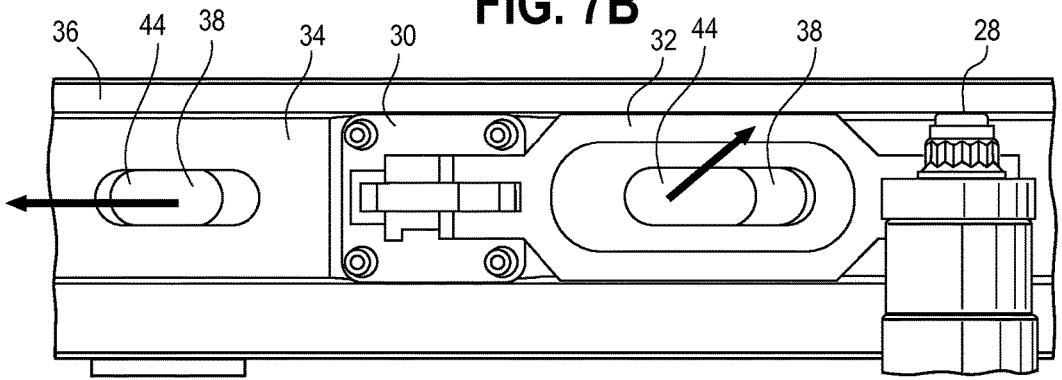

ROTARY EXHAUST VALVE SYSTEM

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to exhaust valve systems, and more particularly, to rotary exhaust valve systems for testing the operation of a compressor.

BACKGROUND

Gas turbine engines comprise a number of components that are assembled in series and axially. One the components in this assembly is a compressor that provides high pressure and high temperature fluid such as a gas through a diffuser to a combustor. Compressors are one of the primary components in a gas turbine engine. In designing a gas turbine engine, the operational characteristics of a compressor are of vital importance to the proper and safe operation of the engine. Specifically, the knowledge of certain operational characteristics such as the limits of choke and surge characteristics of the compressor are crucial in preventing stalls, which may result in catastrophic events. Before installing a compressor into a gas turbine engine, each compressor must be tested to make sure that it operates within the intended design limits.

One of the ways to check for the surge and choke values of the compressor is by modulating a variable such as the exhaust fluid flowrate and thereby the backpressure. Traditionally, a butterfly valve has been employed to modulate this variable. However, it has been observed that the butterfly valve system may not provide a robust control system for checking the surge and choke values. Thus there is a need for another valve system to more precisely modulate the exhaust flowrate to better measure the surge and choke values of any desired compressor.

SUMMARY

According to one aspect, a rotary exhaust valve system includes an arcuate ring having a first plurality of apertures and a rotary valve ring disposed in an overlapping relation with the arcuate ring. The rotary valve ring has a second plurality of apertures formed therein corresponding to at least some of the first plurality of apertures. A first crank is disposed in a first side of the rotary exhaust valve system, and a second crank is disposed in a second side of the rotary exhaust valve system. The second crank is connected to the first crank and the rotary valve ring, and the first crank actuates the second crank and moves the rotary valve ring such that openings of the first plurality of apertures are closed and opened.

According to another aspect, a fluid extraction system includes an exhaust valve system, which comprises a first member having a first plurality of apertures, and a second member having a second plurality of apertures disposed adjacent to the first member. An actuation unit is operatively connected to the second member and is configured to align at least some of the second plurality of apertures with respect to the first plurality of apertures such that a predetermined flow of exhaust fluid can pass through the at least some of the aligned first and second plurality of apertures.

According to another aspect, a rotary exhaust valve system is provided for testing the operation of a compressor. The rotary exhaust valve system includes an O-ring having a first aperture, and a rotary valve ring disposed in an overlapping relation with the O-ring having a second aperture. An actuator unit having a spacer is connected to the rotary valve ring to adjust alignment of the second aperture with respect to the first aperture, such that an opening between the first aperture and the second aperture is adjusted based on size of the spacer.

Other aspects and advantages will become apparent upon consideration of the following detailed description and the attached drawings wherein like numerals designate like structures throughout the specification.

BRIEF DESCRIPTION OF THE DRAWINGS

FIG. 7A is an enlarged, fragmentary, plan view of small openings formed in the rotary valve ring of the embodiment of FIG. 1; and FIG. 7B is an enlarged, fragmentary, plan view of large openings formed in the rotary valve ring of the embodiment of FIG. 1.

DETAILED DESCRIPTION

As shown herein an exhaust valve system is provided that utilizes two members having apertures where the two members are disposed in an overlapping relation and connected to an actuation unit to align at least some of the apertures such that a flow of a fluid through one or more openings of the aligned apertures is adjusted. An axial flow of the fluid is transformed to a radial flow as the fluid passes through the openings. In an example, the exhaust valve system may be employed as part of a fluid extraction system.

By moving one member with respect to the other member for a predetermined angular distance, the openings areas are opened and closed a predetermined amount between fully closed and fully open positions. Therefore, a radial variable area exhaust flow is produced depending on the size of the openings to provide for a wide range of mass fluid flowrates with uniform extraction and uniform backpressure on an air system such as a compressor that may be coupled to the exhaust valve system. Through modulation of the exhaust flowrate, choke and surge values of the compressor are tested and determined. The uniform extraction or uniform ejection of the fluid such as air reduces an asymmetrical pressure distribution on the compressor that facilitates a simulation of an actual engine exhaust through a turbine and nozzle of a gas turbine engine. The overlapping relation of the apertures and the resultant radial openings are efficiently effected by a set of interchangeable spacers associated with the actuation unit as further described below. The following examples further illustrate a specific embodiment but, of course, should not be construed in any way as limiting the scope of this disclosure.

Figure 1:
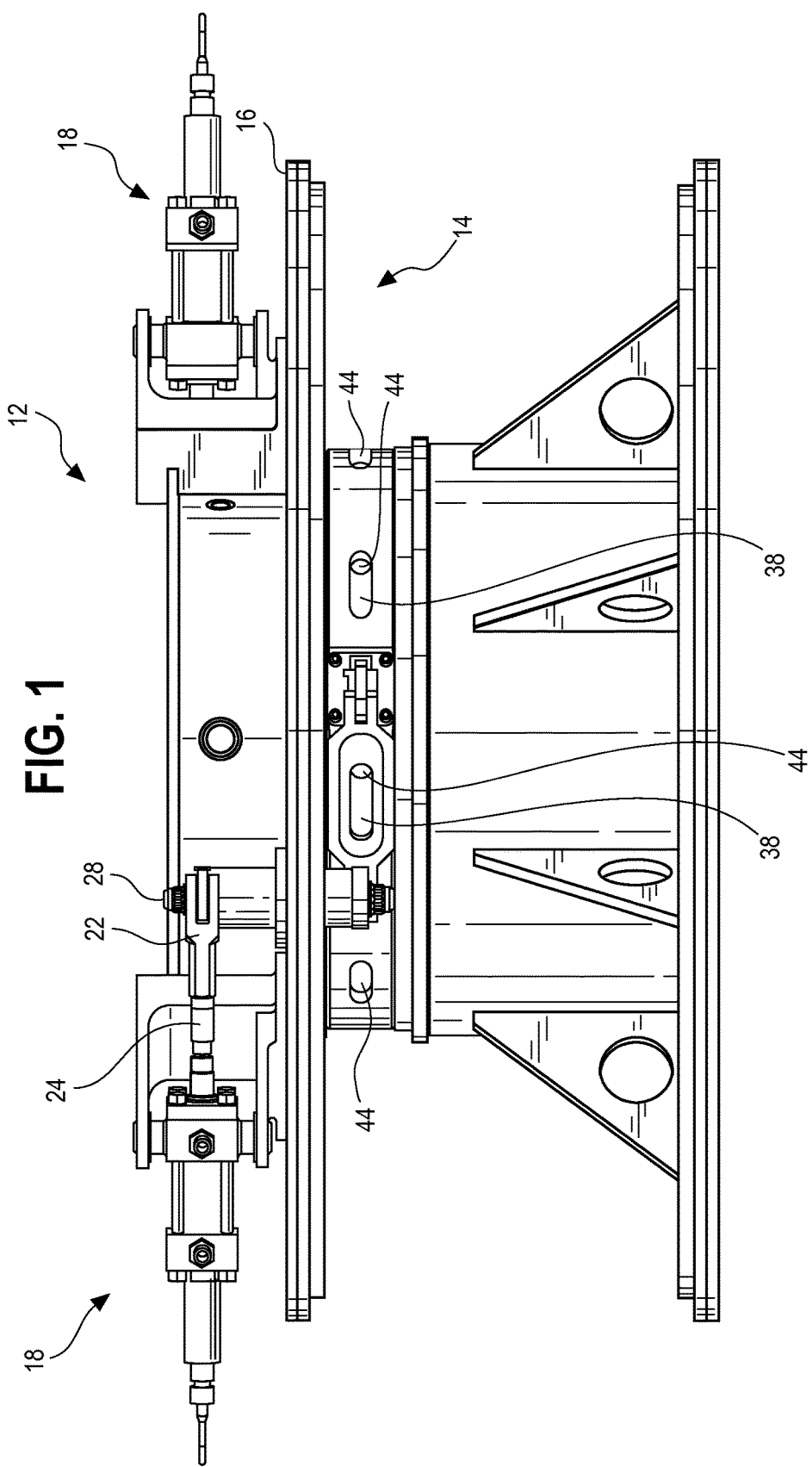
FIG. 1 is a side view of an embodiment of a rotary exhaust valve system.
Figure 2:
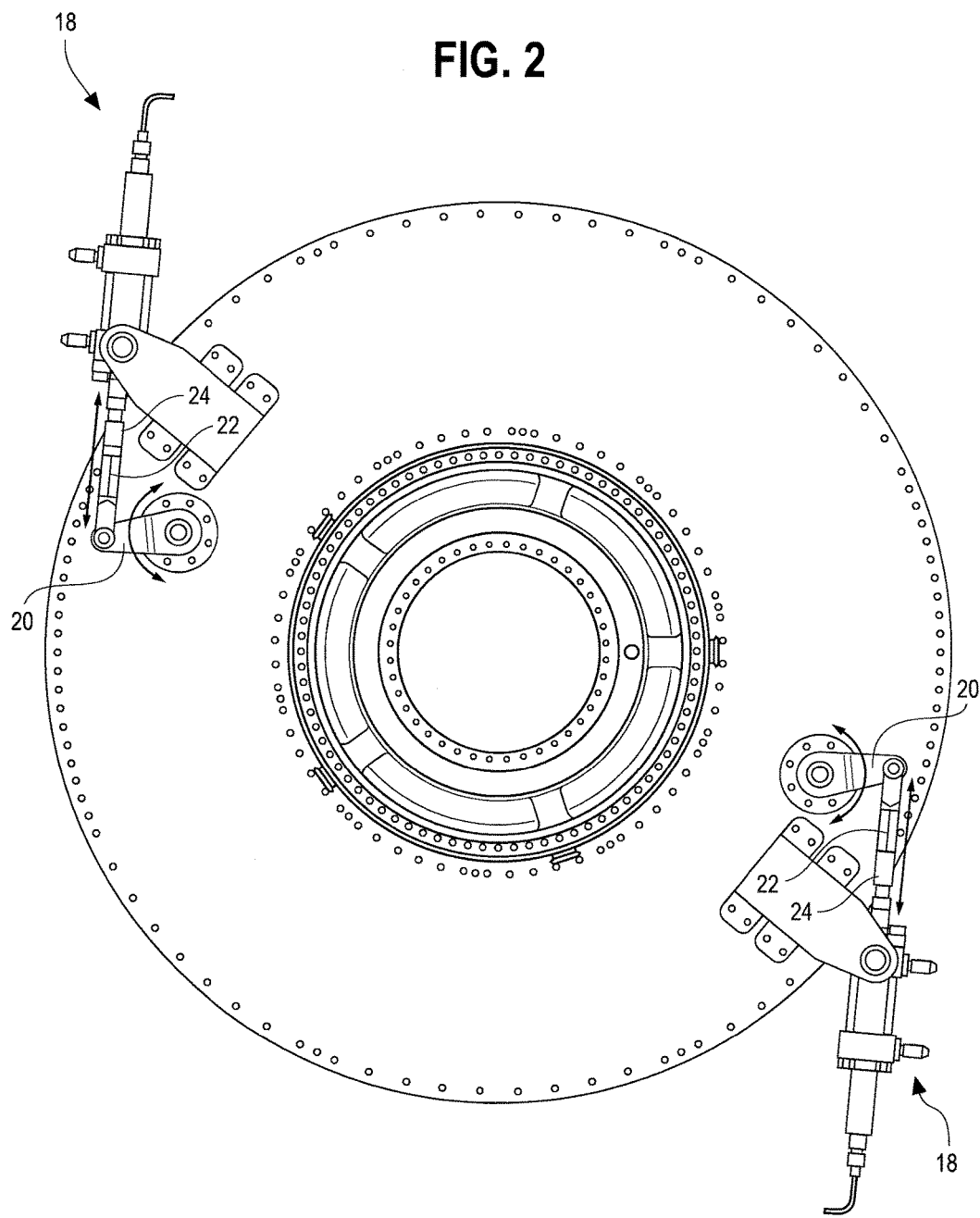
FIG. 2 is a plan view of a first side of the embodiment of the rotary exhaust valve system of FIG. 1.

FIG. 1 illustrates a side view of an embodiment of a rotary exhaust valve system 10 having a first side 12 and a second side 14. In this embodiment, the first side 12 may be referred to as the "cold" side and the second side 14 may be referred to as the "hot" side. The "cold" side is at ambient temperature and surrounding and is external to the "hot" side. The "hot" side is within an enclosure and is exposed to hot exhaust fluid/gas. A separation member 16 separates the first side 12 from the second side 14. The separation member 16 may be a plate or any other form of a barrier known to those skilled in the art. It should be noted that when the rotary exhaust valve system 10 is used in testing the operation of the compressor, the second side 14 may be a plenum that encloses a portion of the rotary exhaust valve system 10. The enclosed portion includes high pressure hot-gas exhaust openings formed by apertures of valve rings described below in further detail. Referring to FIGS. 1 and 2, one or more actuation unit(s) 18 are disposed on the first side 12 and each is connected to a corresponding first crank 20 via an actuator arm 22. A spacer 24 is disposed on the actuator arm 22 and facilitates adjustments of a range of motion of the first crank 20. As the actuator arm 22 is moved, the first crank 20 is reciprocated back and forth.

Figure 3:
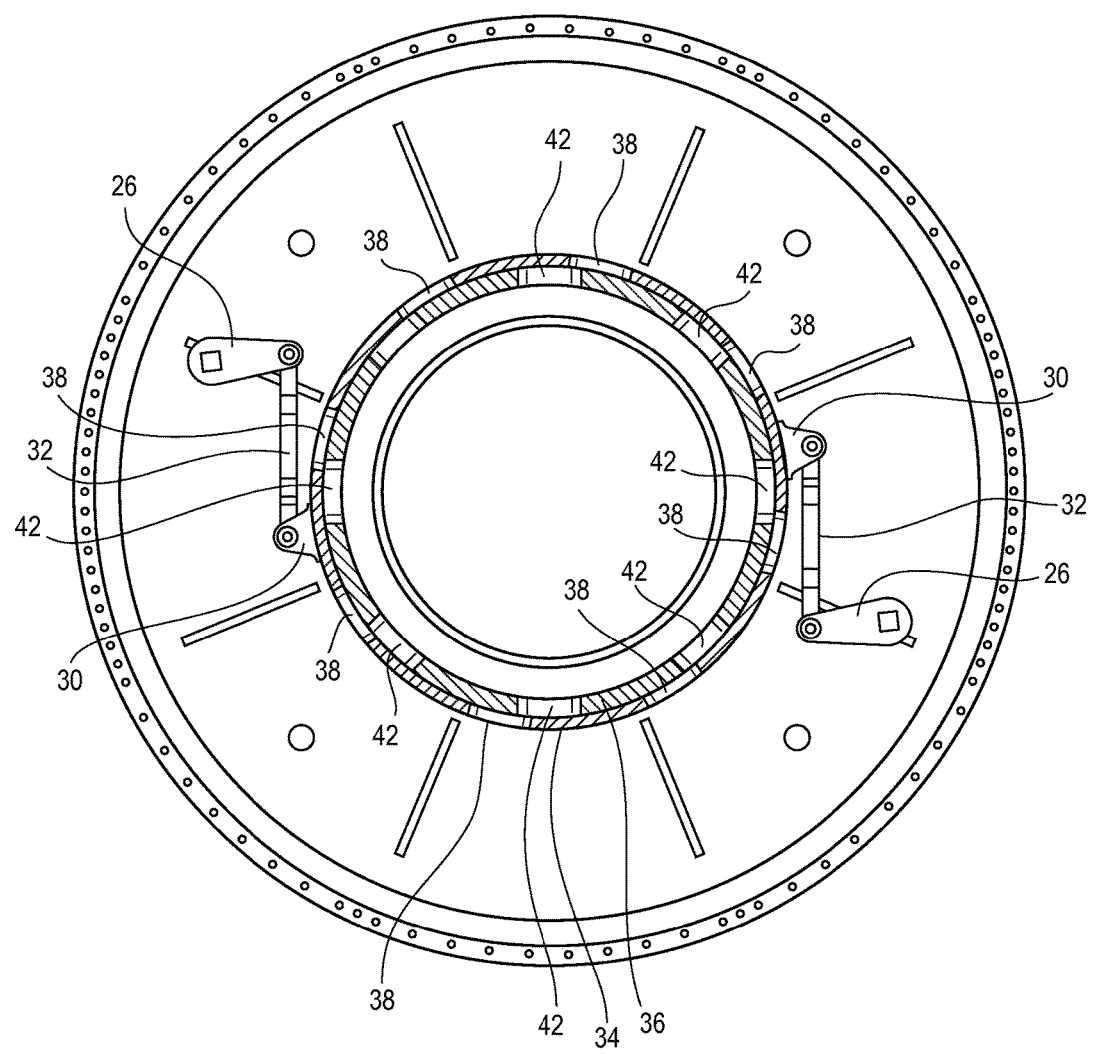
FIG. 3 is a plan view of a second side of the embodiment of the rotary exhaust valve system of FIG. 1.

Referring to FIG. 3, one or more second crank(s) 26 are disposed on the second side 14 of the exhaust valve system 10. Each second crank 26 is respectively connected to a corresponding first crank 20 on the first side via a crankshaft 28 as further explained below. The second crank 26 is also coupled to a bracket 30 by a connector rod 32. The bracket 30 is attached to a member in the form of a rotary valve ring 34 on the second side 14. The rotary valve ring 34 is disposed in an overlapping relation with another member in the form of an O-ring or more generally an arcuate ring 36.

Figure 4:
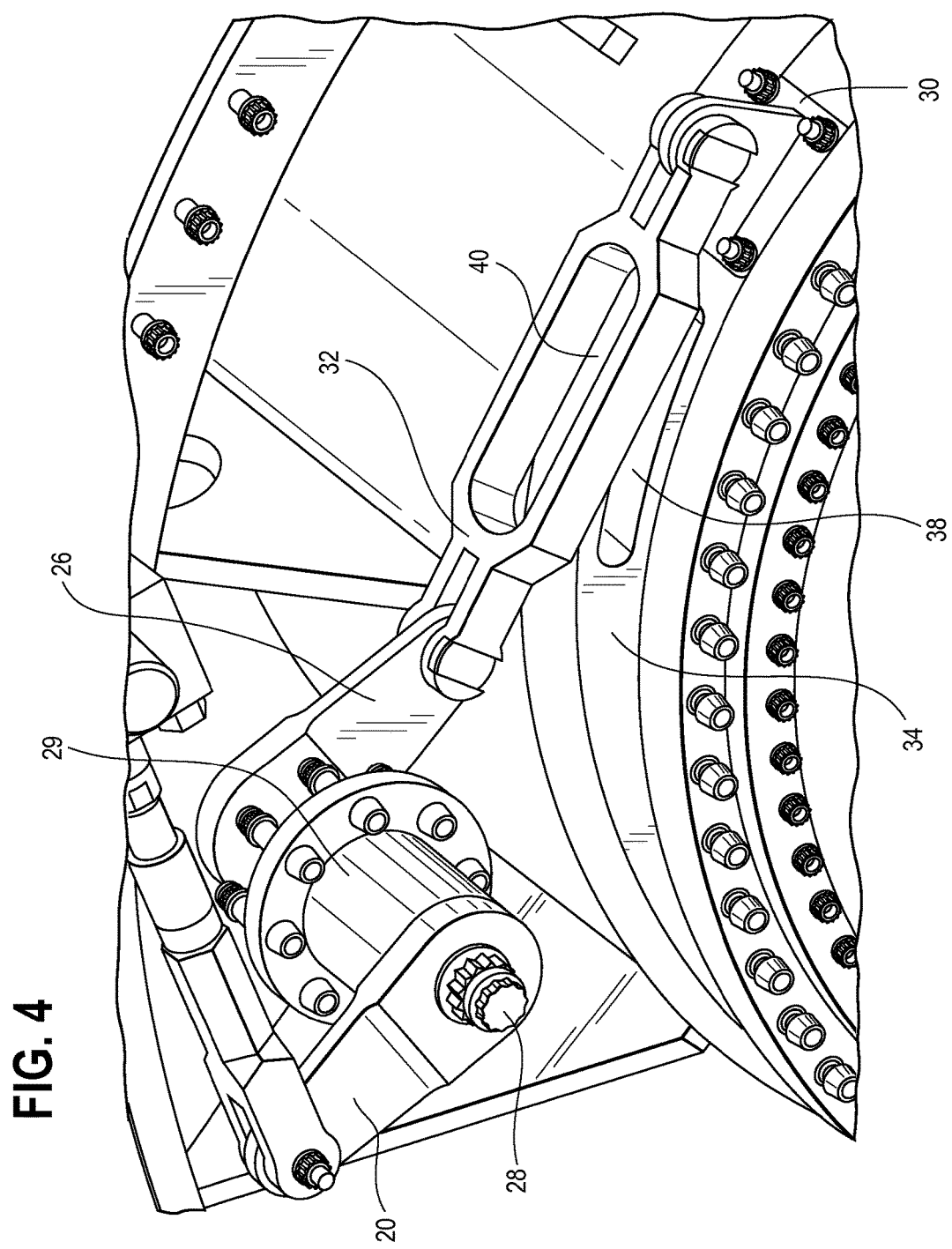
FIG. 4 is an enlarged, fragmentary, isometric view of the embodiment of the rotary exhaust valve system of FIG. 1.

As shown in further detail in FIG. 4, the crankshaft 28 by operatively connecting the first crank 20 to the second crank 26 transfers the movement of the first crank 20 to the second crank 26 on the second side 14. It should be noted that the separation member 16 is omitted in FIG. 4 to better illustrate the connection between the first crank 20 and the second crank 26. The crankshaft 28 traverses the separation member 16 through a crankshaft casing 29. The rotary valve ring 34 has at least one aperture 38 formed therein. In the present embodiment, the connector rod 32 has an oval-shaped opening 40 in the middle portion thereof that is substantially similar in size and shape to the aperture 38 formed in the rotary valve ring 34 such that the fluid flow exhausted through the aperture 38 is unimpeded by the middle portion of the connector rod 32 and passes through the opening 40. The aperture 38 and the opening 40 may have various shapes and sizes other than the oval-shape illustrated in FIG. 4.

Figure 5:
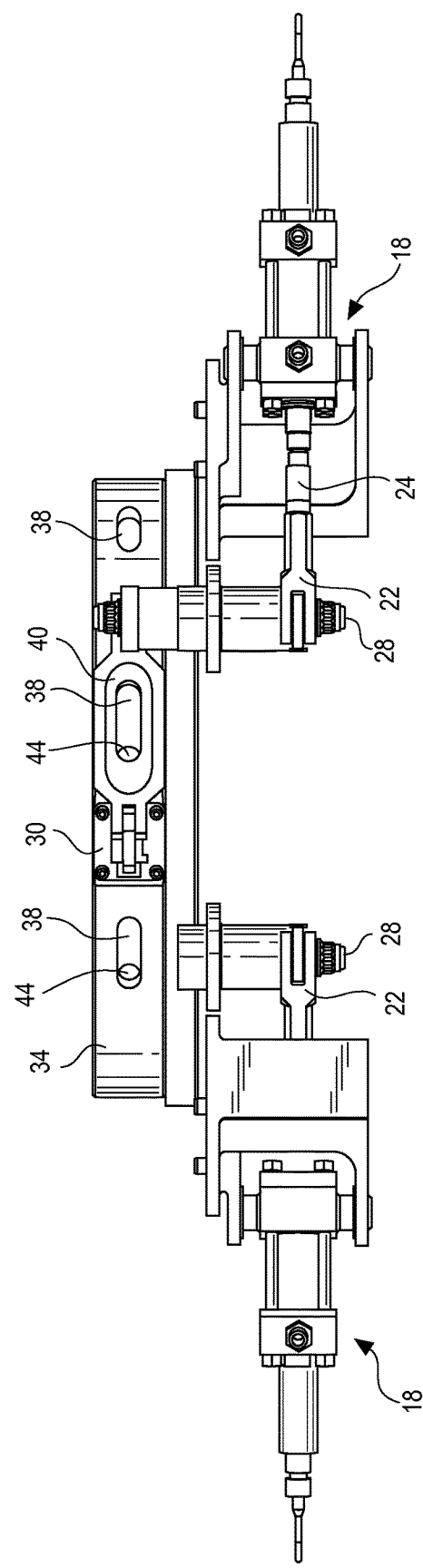
FIG. 5 is a plan view of the embodiment of the rotary exhaust valve system of FIG. 1.

Referring to FIG. 5, the spacer 24 is disposed on the actuator an 122 of the actuation unit 18 to set a range of travel or stroke length of the actuator arm 22. The spacer 24 sets the starting position of the range of travel of the actuator arm 22. For example, use of a shorter spacer results in a first range of travel having a first starting position and a longer spacer results in a second and different range of travel having a second starting position. It should be noted that the interchangeability of different size/length spacers onto the actuator arm 22 provides for cost and time efficiency in adjusting the range of travel of the actuator arm 22 without the need to replace the actuator arm 22 with a different size actuator arm 22 in every instance where a different range of travel is desired.

Figure 6:
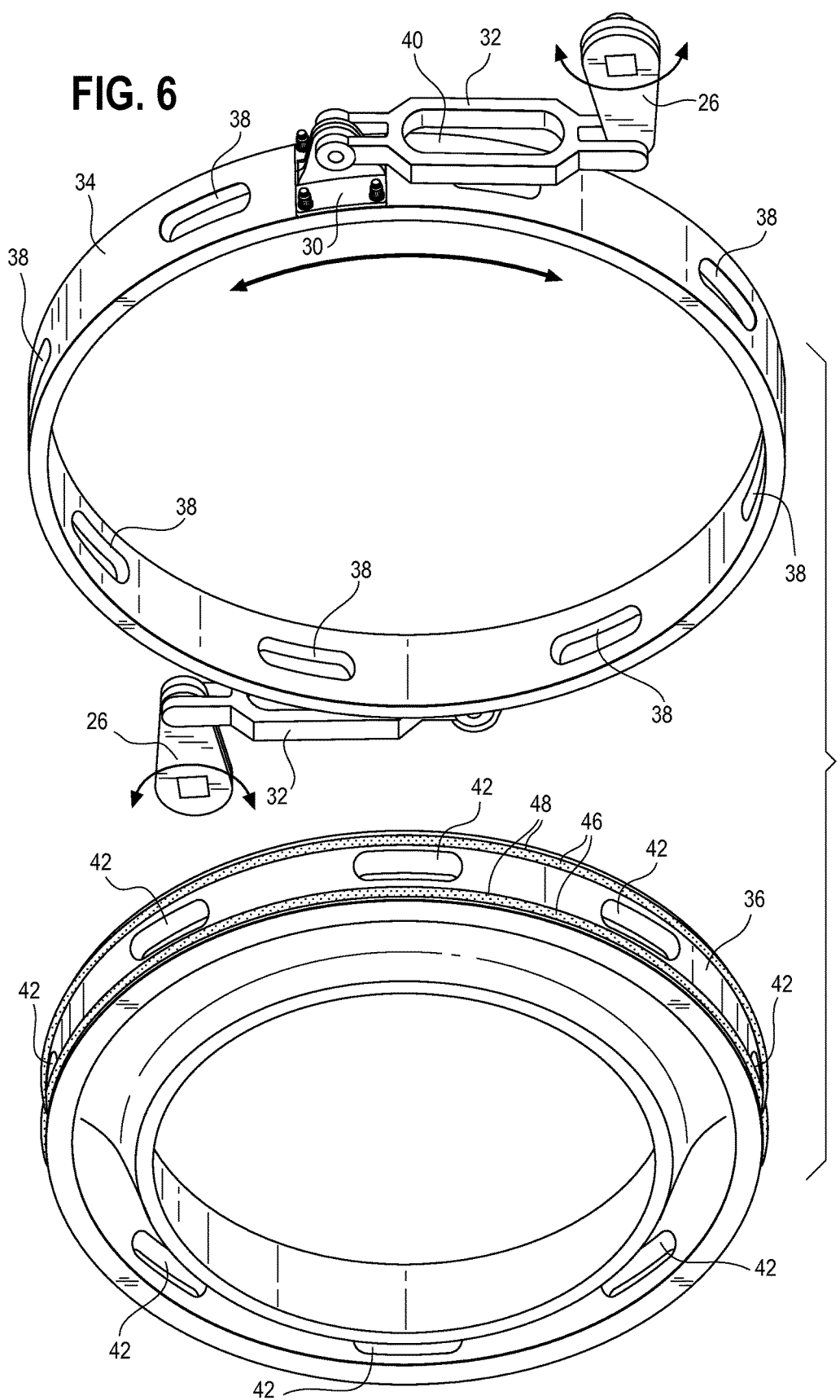
FIG. 6 is an enlarged, exploded view of an arcuate ring and a rotary valve ring of the embodiment of rotary exhaust valve system of FIG. 1.

As shown in FIG. 6, the rotary valve ring 34 is disposed in an overlapping relation with the arcuate ring 36. The arcuate ring 36 has apertures 42 formed therein. During operation, reciprocating motion of the actuator arm 22 is transferred through the first crank 20 to the second crank 26 via the crankshaft 28. As the second crank 26 reciprocates back and forth, the rotary valve ring 34 connected to the second crank 26 via the connector rod 32 and the bracket 30 moves through a predetermined range of motion. Consequently, the range of motion of the rotary valve ring 34 corresponds to the range of travel of the actuator arm 22, which in turn is adjusted by the length/size of the spacer 24 as described hereinabove. As the rotary valve ring 34 moves, the rotary valve ring apertures 38 align with the arcuate ring apertures 42. This alignment produces areas of exposed voids in the form of openings 44 between the apertures 38 and 42. The extent and size of the area of openings 44 is determined based on the length/size of the spacer 24 on the actuator arm 22. For example, a short spacer may set the starting position of the rotary valve ring 34 in relation to the arcuate ring 36 such that when the rotary valve ring 34 is moved a final point of travel in the range of motion of the rotary valve ring 34 produces the opening 44 that is smaller in area than if a long spacer is employed. In other words, a long spacer 24 would set a different starting position for the rotary valve ring 34 and as a result the final point of travel of the rotary valve ring 34 produces another opening 44 which may have a different or larger area.

Referring to FIG. 6, at least two seals 46 are positioned between the rotary valve ring 34 and the arcuate ring 36. For example, the two seals may be in a shape of piston rings. Each seal 46 is preferably disposed in a respective groove 48 formed in the arcuate ring 36. The apertures 38 and 42 of the respective rotary valve ring 34 and the arcuate ring 36 are between the two seals 46. Therefore, any fluid flowing through the opening 44 formed by alignment of apertures 38 and 42 is prevented from leaking out laterally through a small gap between the overlapping rotary valve ring 34 and the arcuate ring 36.

Referring to FIGS. 7A and 7B, openings 44 are shown as having small and large size areas. The relative small size of the openings 44 shown in FIG. 7A compared to the large size openings 44 shown in FIG. 7B is because of a small spacer 24 disposed on the actuator arm 22 that causes the aperture 38 of the rotary valve ring 34 to move and overlap about a quarter of the area of the aperture 42 of the arcuate ring 36. In contrast, when the short spacer 24 is interchanged with a long spacer 24 on the actuator arm 22, then the aperture 38 is moved to overlap most of the area of the aperture 42 and produce larger area openings 44. In this manner, by adjusting the size of the openings 44, the fluid flowrate through the openings 44 is modulated. As described hereinabove, the flowrate of the high pressure gas/exhaust fluid from the compressor, which is coupled to the rotary exhaust valve system 10 is modulated so that surge and choke values of the compressor can be determined.

As seen in the present embodiment, an axial flow of an exhaust fluid such as a high pressure gas is directed toward the rotary valve ring 34 and the arcuate ring 36. The high pressure gas is exhausted through the openings 44, which are distributed radially around the rotary valve ring 34 and as such the axial flow of the high pressure gas/exhaust fluid is transformed to a radial flow. The radial flow provides a substantially uniform ejection of the exhaust fluid that reduces asymmetrical pressure distribution on the compressor that more accurately simulates an actual engine exhaust through a turbine and nozzle of a gas turbine engine. Furthermore, by interchanging a spacer 24 of one length/size with another spacer 24 of a different length/size, the size of the area of the opening 44 is changed accordingly. Therefore, the radial flow of the exhaust fluid is modulated through the apertures 38 and 42 based on the length/size of the spacer 24. In the present embodiment, the arcuate ring 36 is stationary and the rotary valve ring 34 is moveable. In alternative embodiments, the arcuate ring 36 may also be moveable through an actuation assembly known to those skilled in the art.

The rotary exhaust valve system 10 employed as part of a fluid extraction system provides for a predetermined flow of exhaust fluid, which is modulated and permitted to pass through the openings 44. The rotary exhaust valve system 10 in combination with a compressor (not shown) of a gas turbine engine also provide for testing the operation of the compressor. As the compressor is coupled to the rotary exhaust valve system 10 surge and choke characteristic values of the compressor may be measured by modulation of the allowed flowrate of the exhaust fluid passing through the overlapping apertures 38, 42 which define the openings 44. The design options for a rotary exhaust valve system 10 utilizing an overlapping rotary valve ring 34 and an arcuate ring 36 as described herein are not limited to any specific application and/or a specific fluid source.

INDUSTRIAL APPLICABILITY

As provided herein, the rotary valve system may be employed in connection with a compressor, and more specifically a compressor intended to be used in a gas turbine engine. The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A rotary exhaust valve system, comprising:
    an arcuate ring having a first plurality of apertures therein;
    a rotary valve ring disposed in an overlapping relation with the arcuate ring, the rotary valve ring having a second plurality of apertures formed therein corresponding to at least some of the first plurality of apertures;
    a first crank disposed in a first side of the rotary exhaust valve system; and
    a second crank disposed in a second side of the rotary exhaust valve system, the second crank connected to the first crank and the rotary valve ring, wherein the first side is separated from the second side via a separation member, wherein a crankshaft passing through the separation member connects the first crank to the second crank, wherein the first crank actuates the second crank and moves the rotary valve ring to align the at least some of the second plurality of apertures with the at least some of the first plurality of apertures forming openings that are closed and opened by movement of the rotary valve ring.

2. The rotary exhaust valve system of claim 1, further comprising an actuator arm connected to the first crank, which reciprocates the first crank back and forth.

3. The rotary exhaust valve system of claim 2, further comprising a spacer disposed on the actuator arm to adjust a range of motion of the first crank and the second crank, whereby sizes of the openings are adjusted based on a size of the spacer.

4. The rotary exhaust valve system of claim 3, wherein an axial flow of an exhaust fluid through the rotary exhaust valve system is transformed to a radial flow through the openings formed by the alignment of the at least some of the first and second plurality of apertures.

5. The rotary exhaust valve system of claim 4, wherein the radial flow of the exhaust fluid is modulated through adjustment of the openings based on selection of different size of the spacer.

6. The rotary exhaust valve system of claim 1, wherein the arcuate ring is stationary and the rotary valve ring is moveable, and wherein the first side is at substantially ambient temperature and the second side is at substantially exhaust fluid temperature.

7. A fluid extraction system including an exhaust valve system, comprising:
    a first member having a first plurality of apertures therein;
    a second member having a second plurality of apertures therein, the second member disposed adjacent to the first member;
    an actuation unit comprising an actuator connected to a first crank disposed on a first side of the exhaust valve system, a second crank disposed on a second side of the exhaust valve system connected to the first crank;
    a separation member separating the first side from the second side; and
    a crankshaft passing through the separation member connecting the first crank to the second crank, whereby the actuation unit is operatively connected to the second member and configured to align at least some of the second plurality of apertures with respect to the first plurality of apertures such that a predetermined flow of exhaust fluid can pass through the at least some of the aligned first and second plurality of apertures.

8. The fluid extraction system of claim 7, wherein
    the second crank reciprocates at least one of the first member and the second member with respect to each other.

9. The fluid extraction system of claim 8, wherein the actuation unit further comprises a spacer disposed on the actuator to change a length of the actuator and thereby adjust a range of motion of the first crank and the second crank such that openings formed by the at least some of the aligned first and second plurality of apertures are adjustable.

10. The fluid extraction system of claim 9, wherein the first member is stationary with respect to the second member.

11. The fluid extraction system of claim 7, further comprising:
a first seal disposed between the first member and the second member; and
a second seal disposed between the first member and the second member opposite the first seal, wherein the first plurality of apertures and the second plurality of apertures are disposed between the first seal and the second seal.

12. A rotary exhaust valve system for testing operation of a compressor, the rotary exhaust valve system comprising:
an O-ring having a first aperture formed therein;
a rotary valve ring disposed in an overlapping relation with the O-ring, the rotary valve ring having a second aperture formed therein; and
an actuator unit having an actuator arm, a first crank, a second crank, and a spacer disposed between and connecting the actuator arm and the first crank;
wherein the first crank is connected to the second crank via a crank shaft passed through a separation member separating a first side from a second side of the rotary exhaust valve system;
wherein the second crank is further connected to the rotary valve ring to adjust alignment of the second aperture with respect to the first aperture, whereby an opening between the first and second aperture is adjusted based on size of the spacer.

13. The rotary exhaust valve system of claim 12, wherein the spacer is adjustable.

14. The rotary exhaust valve system of claim 12, wherein the spacer is interchangeable with another spacer of a different size.

15. The rotary exhaust valve system of claim 14, further comprising:
a first seal disposed between the O-ring and the rotary valve ring; and
a second seal disposed between the O-ring and the rotary valve ring opposite the first seal, wherein the first aperture and the second aperture are disposed between the first seal and the second seal.

16. The rotary exhaust valve system of claim 14, wherein a flow of exhaust fluid from the compressor through the opening is modulated as the opening is adjusted.

17. The rotary exhaust valve system of claim 16, wherein an axial flow of the exhaust fluid is transformed to a radial flow through the first aperture and the second aperture.

18. The rotary exhaust valve system of claim 12, wherein the opening includes an area of an exposed void formed by the alignment of the second aperture and the first aperture.

* * * * *